United States Patent
Harada et al.

[11] Patent Number: 6,005,199
[45] Date of Patent: Dec. 21, 1999

[54] LOAD CELL AND LOAD DETECTING APPARATUS

[75] Inventors: Shunji Harada; Masahiro Hamamatsu, both of Nishinomiya, Japan

[73] Assignee: Kawatetsu Advantech Co., Ltd., Nishinomiya, Japan

[21] Appl. No.: 09/143,524

[22] Filed: Aug. 28, 1998

[30] Foreign Application Priority Data

Aug. 28, 1997 [JP] Japan ..................................... 9-232963
Jan. 21, 1998 [JP] Japan ................................... 10-009456

[51] Int. Cl.[6] ...................................................... G01L 1/00
[52] U.S. Cl. ............... 177/211; 73/862.474; 73/862.632; 73/862.637
[58] Field of Search ....................... 177/211; 73/862.474, 73/862.627, 862.629, 862.632, 862.637, 862.642, 862.391, 862.581, 862.636

[56] References Cited

U.S. PATENT DOCUMENTS

| | | | |
|---|---|---|---|
| 3,213,400 | 10/1965 | Gieb | 73/862.474 |
| 3,284,749 | 11/1966 | Fouretier | 73/862.627 |
| 3,365,689 | 1/1968 | Kutsay | 73/862.629 |
| 3,453,582 | 7/1969 | Birkholtz | 73/862.629 |
| 3,643,502 | 2/1972 | Birkholtz | 73/862.629 |
| 4,166,997 | 9/1979 | Kistler | 73/862.632 |
| 4,744,254 | 5/1988 | Barten | 177/211 |
| 4,811,610 | 3/1989 | Gassmann | 177/211 |
| 4,812,199 | 3/1989 | Sickafus | 73/862.642 |
| 5,024,107 | 6/1991 | Bethe | 73/862.629 |
| 5,313,022 | 5/1994 | Piroozmandi et al. | 177/211 |
| 5,349,871 | 9/1994 | Naganuma | 73/862.635 |

FOREIGN PATENT DOCUMENTS 5-57630  7/1993  Japan .

*Primary Examiner*—Randy W. Gibson
*Attorney, Agent, or Firm*—Wenderoth, Lind & Ponack, L.L.P.

[57] ABSTRACT

A load cell comprises a column elastic body 11; a circle bore 12 formed on a center portion of a first end surface 11a of the column elastic body 11, a bottom wall of which constitutes a load acting surface 13; an annular concave groove 15 formed on a second surface 11b of the column elastic body 11 being coaxial with the circle bore 12, a bottom portion of which constitutes a strain occurrence portion 18, a outer portion of which constitutes a fixing portion 16 of thick cylinder configuration; and Strain gages stuck on the strain occurrence portion. A distance "y" from the load acting surface 13 to a surface of the strain occurrence portion 18 is 0.2 to 2 times shortest distance "e" from a center axis of the column elastic body to the strain gages.

12 Claims, 9 Drawing Sheets

LOAD CELL AND LOAD DETECTING APPARATUS

BACKGROUND OF THE INVENTION

Present invention relates to a compressive-type load cell used in load detecting apparatuses for industrial use such as a hopper scale and a tank scale and to a load detecting apparatus provided with the load cell.

FIG. 11A shows an example of a conventional diaphragm type load cell 1 which is attempted to thin.

A circle bore 3 is formed on a lower surface 2a of a short column elastic body 2. A bottom wall of the circle bore 3 constitutes a strain occurrence portion 4. Strain gages 5 are stuck on a lower surface of the strain occurrence portion 4. These strain gages 5 are connected with each other to constitute a well-known Wheatstone bridge (not shown). Numeral 6 denotes a diaphragm which closes the circle bore 3. On the other hand, a load acting portion 7 of short column configuration is projected upwardly from a center portion of an upper surface of the strain occurrence portion 4.

When a compressive load "W" is applied to a load acting surface 7a constituted by an upper end of the load acting portion 7, the strain occurrence portion 4 is deformed according to the value of the compressive load "W".

Deformation quantity of the strain occurrence portion 4 is detected as variation of output level of the Wheatstone bridge circuit comprising the strain gages 5. The value of the compressive load "W" is measured on the basis of the variation.

However, as shown in FIG. 11A, since load transmission paths "p" from the load acting surface 7a to the each strain gage 5 are parabolic curve without turn-back portion, the length of the load transfer path "p" is short. Thus, when an action axis "$L_W$" is shifted to a center axis "$L_C$" of the load cell 1, the shift of the action axis "$L_W$" has large influence to the deformation quantity of the strain acting portion 4, thereby measurement error may occur.

Further, since the load acting portion 7 of the load cell 1 is projected from the center potion of the strain occurrence portion 4, as shown in FIGS. 11B and 11C, when a lateral load "F" which is orthogonal to the compressive load "W" is applied to the load acting portion 7, bending moment "M" (M=F*L: "L" is a distance form load to a neutral axis plan of the strain acting portion 4) is applied to the strain occurrence portion 4. This bending moment "M" may cause measurement error.

As described above, in the conventional load cell 1, there is high possibility to cause measurement error and it is difficult to execute load measuring with high accuracy.

SUMMARY OF THE INVENTION

The present invention has been achieved to solve the above-described disadvantage of the conventional load cell. Accordingly, it is an object of the invention to improve the accuracy of load measurement.

In order to achieve the object, according to the first aspect invention, there is provided a load cell comprising: a column elastic body; a circle bore formed on a center portion of a first end surface of the column elastic body, a bottom wall of which constitutes a load acting surface; an annular concave groove formed at least on a second surface of the column elastic body opposing to the first surface and being coaxial with the circle bore, a bottom portion of which constitutes a strain occurrence portion of thin annular wall configuration, a outer portion of which constitutes a fixing portion of thick cylinder configuration; and Strain gages stuck on the strain occurrence portion; wherein a distance from the load acting surface to a surface of the strain occurrence portion on which the strain gages are stuck is 0.2 to 2 times shortest distance from a center axis of the column elastic body to the strain gages.

In the load cell according to the first aspect of the invention, since distance from the load acting surface to the surface of the strain occurrence portion on which the strain gages are stuck is 0.2 to 2 times shortest distance from the center axis of the column elastic body to the strain gages, load transmission path from the load acting surface to the strain gages has enough length. Thus, measurement error due to the shift of the acting axis of the load with respect to the center axis can be prevented without increasing height of the column elastic body.

According to the second aspect of the invention, there is provided a load cell comprising: a column elastic body; a circle bore formed on a center portion of a first end surface of the column elastic body, a bottom wall of which constitutes a load acting surface; an annular concave groove formed at least on a second surface of the column elastic body opposing to the first surface and being coaxial with the circle bore, a bottom portion of which constitutes a strain occurrence portion of thin annular wall configuration, a outer portion of which constitutes a fixing portion of thick cylinder configuration; and strain gages stuck on the strain occurrence portion; wherein the load acting surface coincides with a neutral axis plane and the annular groove is formed around the load acting surface.

In the load cell according to the second aspect of the invention, since the load acting surface coincides with the neutral axis plane, when a load of orthogonal direction to the load to be normally detected is applied to the load acting surface, measurement error due to a bending moment applied to the strain occurrence portion is reduced. Further, since the annular groove is formed around the load acting surface, a load transmission path from the load acting surface to the strain gages has enough length. Thus, measurement error due to the shift of the acting axis of the load with respect to the center axis can be prevented.

Preferably, annular concave groove having V-like sectional configuration may be formed on the first end surface of the column elastic body on which the circle bore is formed.

According to the third aspect of the invention, there is provided a load detecting apparatus comprising the load cell of the first or second aspect of the invention; a lower pressure plate to which the second end surface of column elastic body of the load cell opposing to the first surface formed with the circle bore is fixed; an upper pressure plate coupled to a structure a load of which is detected, on a lower surface of which a circle bore is formed; and a load shaft both upper and lower ends of which are respectively inserted in loose into the circle bore of the column elastic body of the load cell and the circle bore of the upper pressure plate, and the upper and lower end surfaces of the load shaft having a convex curved surface configuration respectively and abutting the load acting surface constituted by the bottom wall of the circle bore of the column elastic body and the bottom wall of the circle bore of the upper pressure plate.

Preferably, the load detecting apparatus may further comprise a circle concave portion of a larger diameter than that of the load cell formed on the lower surface of the upper pressure plate, wherein the first end surface of the column elastic body may be loosely inserted into the circle concave portion so that a clearance having a predetermined size is formed between the outer peripheral surface of the column elastic body and the side wall of the circle concave portion.

In this load detecting apparatus, the load applied to the structure is transmitted to the column elastic boy of the load cell through the load shaft. Since clearances having predetermined size are formed between the outer peripheral surface of the column elastic body and the side wall of the circle concave portion, and between the end surface of the column elastic body and the bottom wall of the circle concave portion, when a horizontal load is applied to the structure, the structure can move in horizontal direction at distance corresponding to clearance between the outer peripheral surface of the column elastic body and the side wall of the circle concave portion. Further horizontal load is applied to the structure resulting in abutment of the side wall of the circle concave portion and the outer peripheral surface of the column elastic body. Since the column elastic body is provided with the fixed portion of thick cylinder configuration, the horizontal load is surely supported.

Preferably, the load detecting apparatus may further comprise horizontal locating pins which project from the first end surface of the column elastic body of the load cell; and pin insertion bores of larger diameter than that of the horizontal locating pins which may be formed on the lower side of the upper pressure plate, wherein the horizontal locating pins are inserted into the pin insertion bores so that a clearance having a predetermined size is formed between the outer peripheral surface of the horizontal locating pin and the side wall portion of the pin insertion bore.

In this case, when the horizontal load is applied to the structure, the structure can move in horizontal direction at distance corresponding to the outer peripheral surface of the horizontal location pin and the side wall of the pin insertion bore. Further horizontal load is applied to the structure, resulting in abutment of the horizontal location pin and the side wall of the pin insertion bore. Since the column elastic body is provided with the fixed portion of thick cylinder configuration, the horizontal load is surely supported.

Preferably, the load detecting apparatus may further comprise: a circle concave portion which is formed on the first end surface of the column elastic body of the load cell; and a column-like projection of smaller diameter than that of the circle concave portion projecting from the lower face of the upper pressure plate, wherein the column-like projection is loosely inserted into the circle concave portion so that a predetermined clearance between the outer peripheral surface of the column-like projection and the side wall of the circle concave portion.

In this case, when the horizontal load is applied to the structure, the structure can move in horizontal direction at distance corresponding to the outer peripheral surface of the column-like projection and the side wall of the circle concave bore. Further horizontal load applied to the structure resulting in abutment of outer peripheral surface of the column-like projection and the side wall of the circle concave portion. Since the column elastic body is provided with the fixed portion of thick cylinder configuration, the horizontal load is surely supported.

BRIEF DESCRIPTION OF THE DRAWINGS

Further objects and advantage of the present invention will become clear from the following description taken in conjunction with preferred embodiments thereof with reference to the accompanying drawings, in which.

DETAIL DESCRIPTION OF THE PREFERRED EMBODIMENT

First Embodiment

Figure 1A:
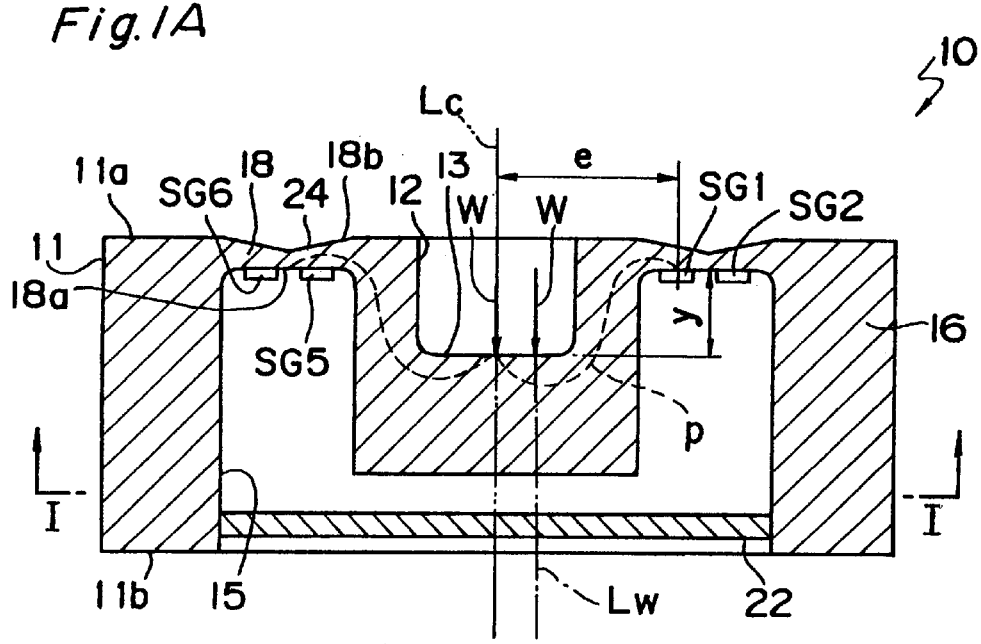
FIG. 1A shows a longitudinal sectional view of a load cell according to a first embodiment of the present invention.
Figure 1B:
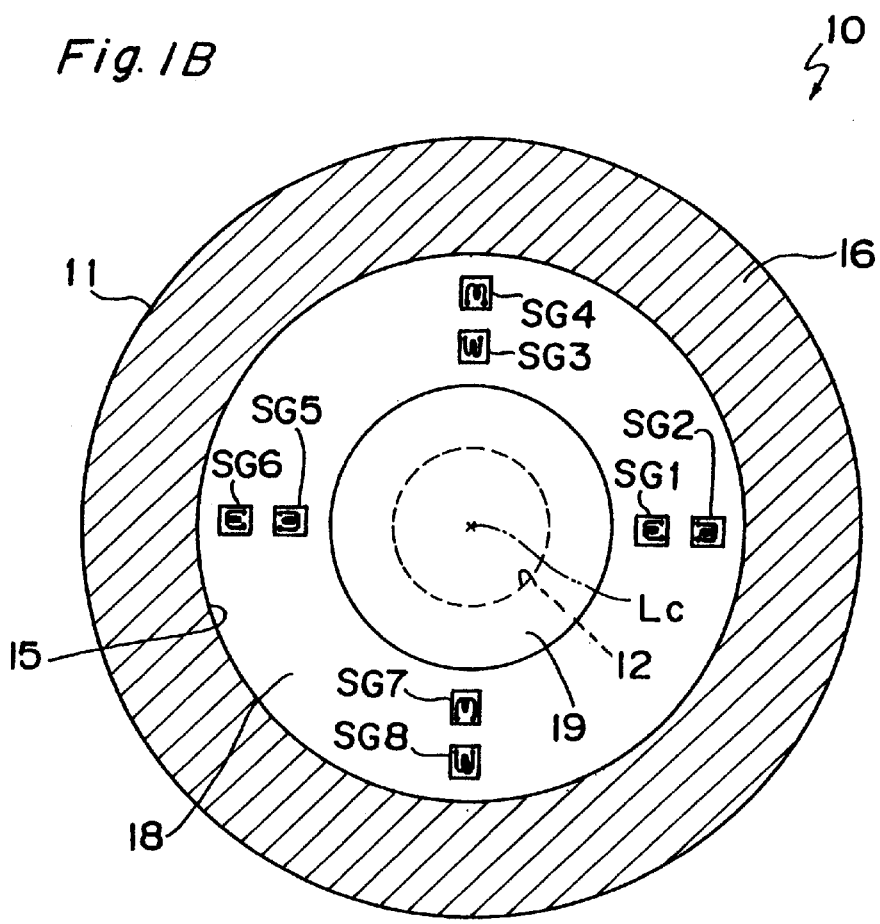
FIG. 1B shows a sectional view taken along line I—I of the FIG. 1A.

As shown in FIGS. 1A and 1B, a load cell 10 is provided with a short column elastic body 11.

A circle bore 12 of given depth is formed on an upper end surface 11a of the short column elastic body 11. The circle bore 12 is arranged to be coaxial with a center axis "$L_C$" of the short column elastic body 11. A bottom portion of the circle bore 12 constitutes a load acting surface 13 on which a compressive load "W" is applied.

On the other hand, on a lower end surface 11b of the shore column elastic body 11, an annular concave groove 15 having larger diameter than that of the circle bore 12 is formed to be coaxial with the circle bore 12. A circumferential wall of the annular concave groove 15 constitutes a fixing portion 16 of thick cylinder configuration. Further, a bottom portion of the annular concave groove 15 constitutes a strain occurrence portion 18 of thin annulus ring configuration.

Figure 2:
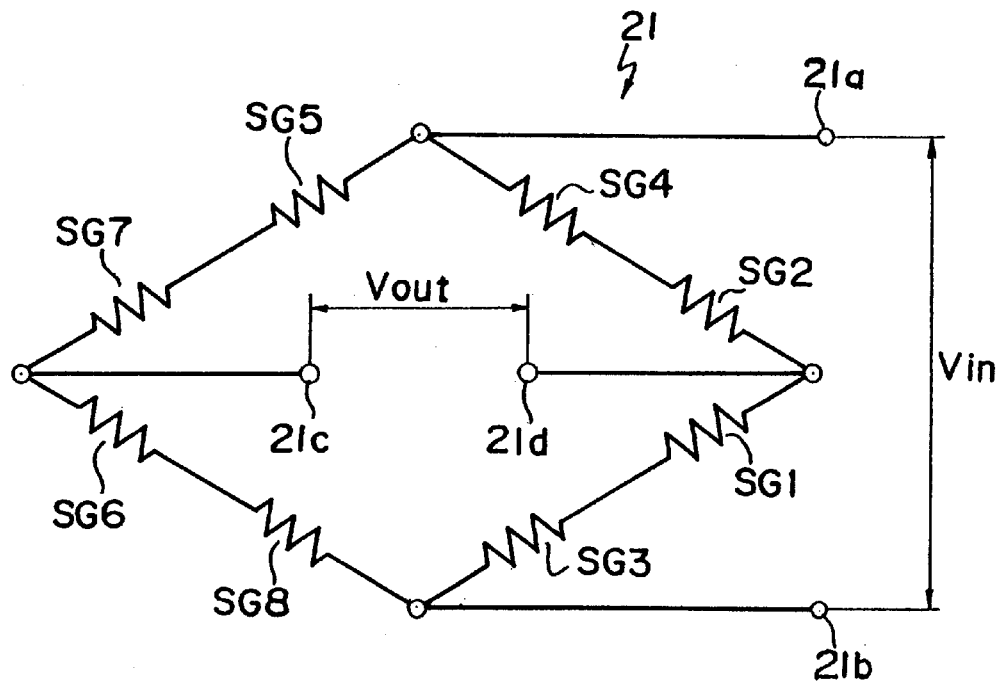
FIG. 2 shows a schematical circuit diagram of a Wheatstone bridge circuit.
Figure 3:
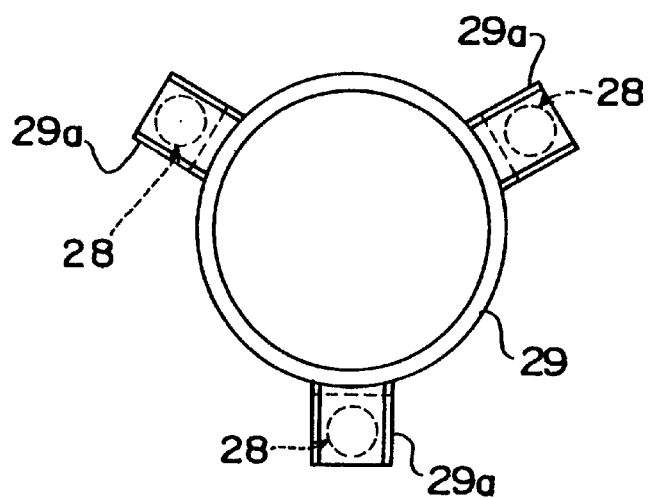
FIG. 3 shows a plan view of a load detecting apparatus having a hopper provided with the load cell of the first embodiment.
Figure 4:
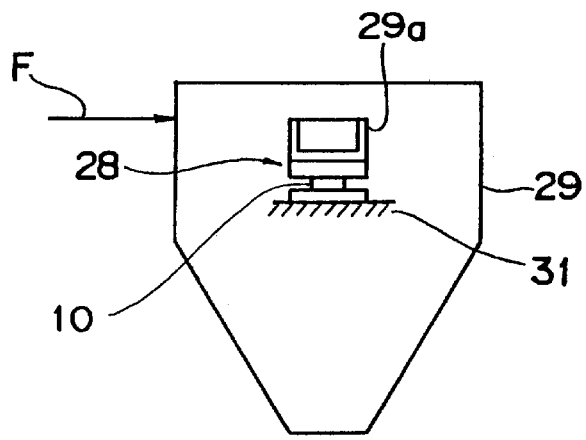
FIG. 4 shows a side view of the hopper of FIG. 3.

As shown in FIG. 1B, eight strain gages "SG1" through "SG8" are stuck on a lower surface 18a of the strain occurrence portion 18. Each pair of the strain gages "SG1" through "SG2" is arranged in radial radiating arrangement with respect to a center axis "$L_C$" at interval of 90 degree. As shown schematically in FIG. 2, the strain gages "SG1" through "SG8" are connected with each other so as to constitute a well-known Wheatstone bridge circuit 21. Each pair of the strain gages "SG1" through "SG8 " is arranged in each arm of the Wheatstone bridge circuit 21. Between terminals 21a and 21b, constant input voltage "$V_{in}$" is applied from a constant-voltage source not shown. Output voltage between terminals 21c and 21d is varied according to variation of resistance of strain gages "SG1" through "SG8" due to the deformation of the strain occurrence portion 18. A diaphragm 22 is mounted in an aperture 15a of the annular concave groove 15 by means such as welding and adhesion so as to maintain airtight condition in the annular concave groove 15. A cable not shown is conducted from a lead-out bore formed in the short column elastic body 11 so that the output voltage "$V_{OUT}$" is outputted to another apparatus not shown.

An annular concave groove 24 is formed on an upper surface 18b of the strain occurrence portion 18 so that thickness of the strain occurrence portion 18 is thinned to improve deformation-sensitivity thereof to the variation of the compressive load "W".

In the load cell 10 of the first embodiment, the bottom wall of the circle bore 12 constitutes the load acting surface 13. Thus, as shown in FIG. 1A, a load transmission path "p" through which the compressive load "W" applied on the load acting surface 13 is transmitted to the strain gages "SG1" through "SG8" is initially directed toward the lower end surface 11b. Then the load transmission path "p" turns back toward the upper end surface 11a, and reaches at the strain gages "SG1" through "SG8". Accordingly, the length of the load transmission path "p" is long. It is known as Saint-Venant's principle that in case that a plurality of loads applied to an elastic body are balanced the distribution of stress is homogenized with increase of distance from the point where a load is applied. Accordingly, in case that length of the load transmission path "p" from the load acting surface 13 to the strain gages "SG1" through "SG8" is long, the shift of the action axis "$L_W$" of the compressive load "W" with respect to the center axis "$L_C$" of the short column elastic body 11 shown in FIG. 1A does not have considerable influence to the deformation of the strain occurrence portion 18. Consequently, change of measurement error caused by the shift of the action axis "$L_C$" is prevented.

The depth of the circle bore 12 is preferably set so that distance "y" from the load acting surface 13 to the lower surface 18a of the strain occurrence portion 18 on which the strain gages "SG1" through "SG8" are stuck is 0.2 to 2 times the horizontal shortest distance "e" from the center axis "$L_C$" of the short column elastic body 11 to the strain gages "SG1" through "SG8".

Reason for the distance "y" set aforementioned range is to comply with both needs for improvement of the load measurement accuracy and for decreasing thickness of the load cell. When the distance "y" is smaller than 0.2 times the shortest distance "e", the distance "y" is too short for reducing the effect of the shift of the action axis "$L_W$" of the compressive load "W". On the other hand, when the distance "y" exceeds 2 times the shortest distance "e", height of the short column elastic body 11 is too large. In this case, the thickness of the load cell 10 can not be reduced, resulting in high cost due to the large size of the load cell 10.

FIGS. 3 through 6 show a hopper 29 to which a load detecting apparatus 28 provided with the load cell 10 of the first embodiment is equipped. Three brackets 29a projecting from outer surface of the hopper 29 are arranged at constant angular interval. These brackets 29a are supported by a frame 31. The load detecting apparatus 28 having the load cell 10 is inserted between the bracket 29a and the frame 31.

Figure 5:
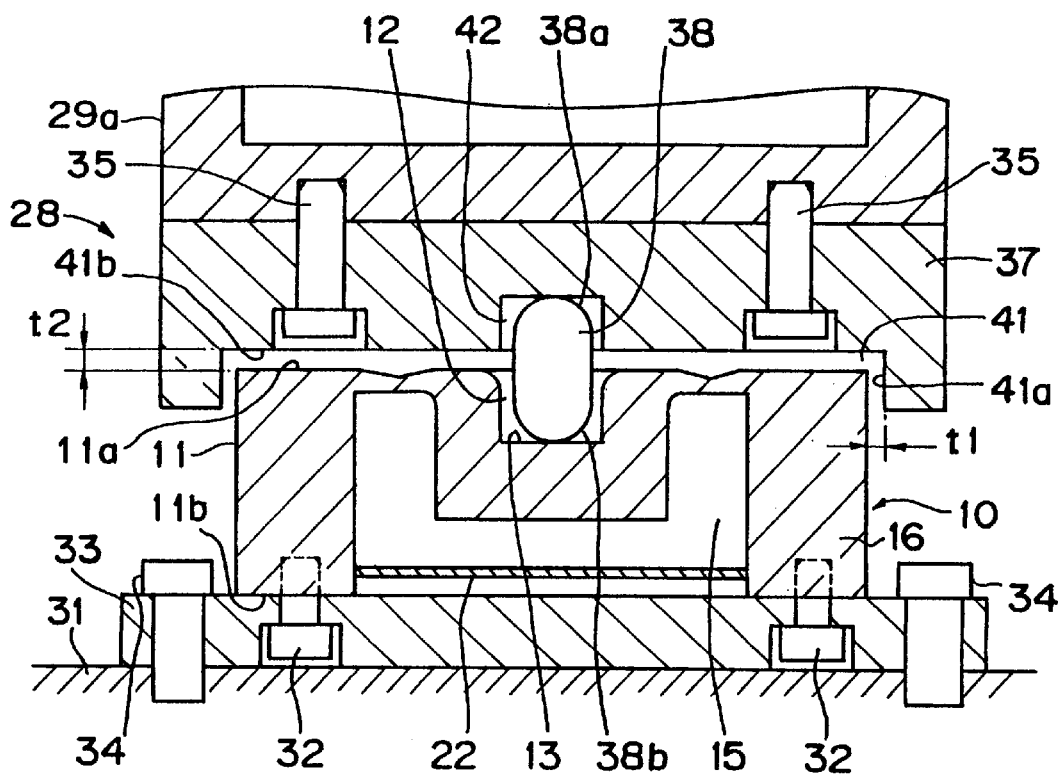
FIG. 5 shows a pertial enlarged sectional view of the load detecting apparatus provided with the load cell of the first embodiment.
Figure 6:
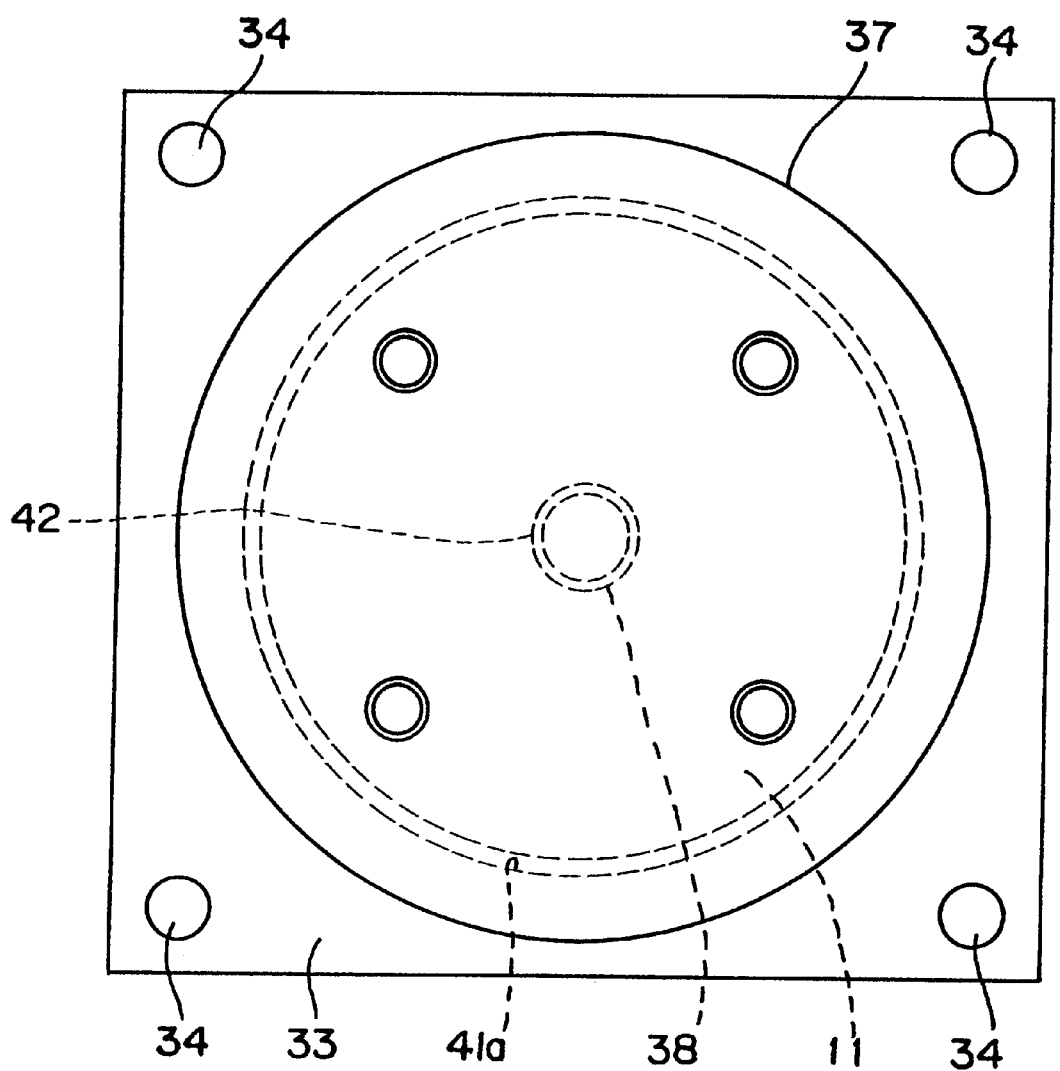
FIG. 6 shows a plane view of the load detecting apparatus provided with the load cell of the first embodiment.

As shown in FIG. 5, the lower end surface 11b of the short column elastic body 11 of the load cell 10 is fixed to a rectangular lower pressure plate 33 by bolts 32. The lower pressure plate 33 is fixed to the frame 31 by bolts 34.

The bracket 29a is supported by the load cell 10 fixed to the lower pressure plate 33 through an upper pressure plate 37 fixed to the bracket 29a by bolts 35 and a load shaft 38.

The upper pressure plate 37 of disc-like configuration is formed with a circle concave 41. The circle concave 41 has slightly larger diameter than that of the short column elastic body 11. A center portion of the circle concave 41 is formed with a circle bore 42. An upper end portion of the short column elastic body 11 of the load cell 10 is loosely inserted into the circle concave 41 so that the circle concave 42 of the upper pressure plate 37 and the circle bore 12 is opposed with each other in a coaxial condition.

End surfaces 38a and 38b of the load shaft 38 are half-spherical surfaces. An upper end portion of the load shaft 38 is loosely inserted into the circle bore 12 so that the upper end surface 38a of half spherical surface abuts on the flat bottom wall of the circle bore 12. On the other hand, the lower end of the load shaft 38 is loosely inserted into the circle bore 12 of the short column elastic body 11 of the load cell 10 so that the lower end portion 38b of half spherical surface abuts the flat load acting surface 13.

Since the outer diameter of the short column elastic body 11 is smaller than the diameter of the circle concave 41 of the upper pressure plate 37, a clearance "t1" is formed between the outer peripheral surface of the short column elastic body 11 loosely inserted into the circle concave 41 and a side wall 41a of the circle concave 41. Further, a clearance "t2" is formed between the upper end surface 11a of the short column elastic body 11 and a bottom surface 41b of the circle concave 41.

When a horizontal load "F" such as wind pressure acts to the hopper 29, the upper pressure plate 37 is moved in the distance corresponding to the clearance "t1" toward the direction of the horizontal load "F". As the result, rolling of the hopper 29 is absorbed. When the horizontal moving distance of the upper pressure plate 37 exceeds the clearance "t1", the side wall 41a of the circle concave 41 abuts the outer peripheral surface of the short column elastic body 11. As the result, the horizontal load "F" is supported by the short column elastic body 11. As aforementioned, the short column elastic body 11 has enough rigidity against the lateral load acting toward the orthogonal direction to the center axis "$L_C$" since the short column elastic body 11 has the fixing portion 16 of thick cylinder configuration. Thus, the horizontal load "F" of large intensity is surely supported in case that the horizontal load "F" is large.

As described above, in the load detecting apparatus 28, the horizontal rolling of the hopper 29 can be absorbed and the horizontal load can be supported without cross rods and turnbuckles used for supporting the horizontal load in the conventional load detecting apparatus.

Figure 7:
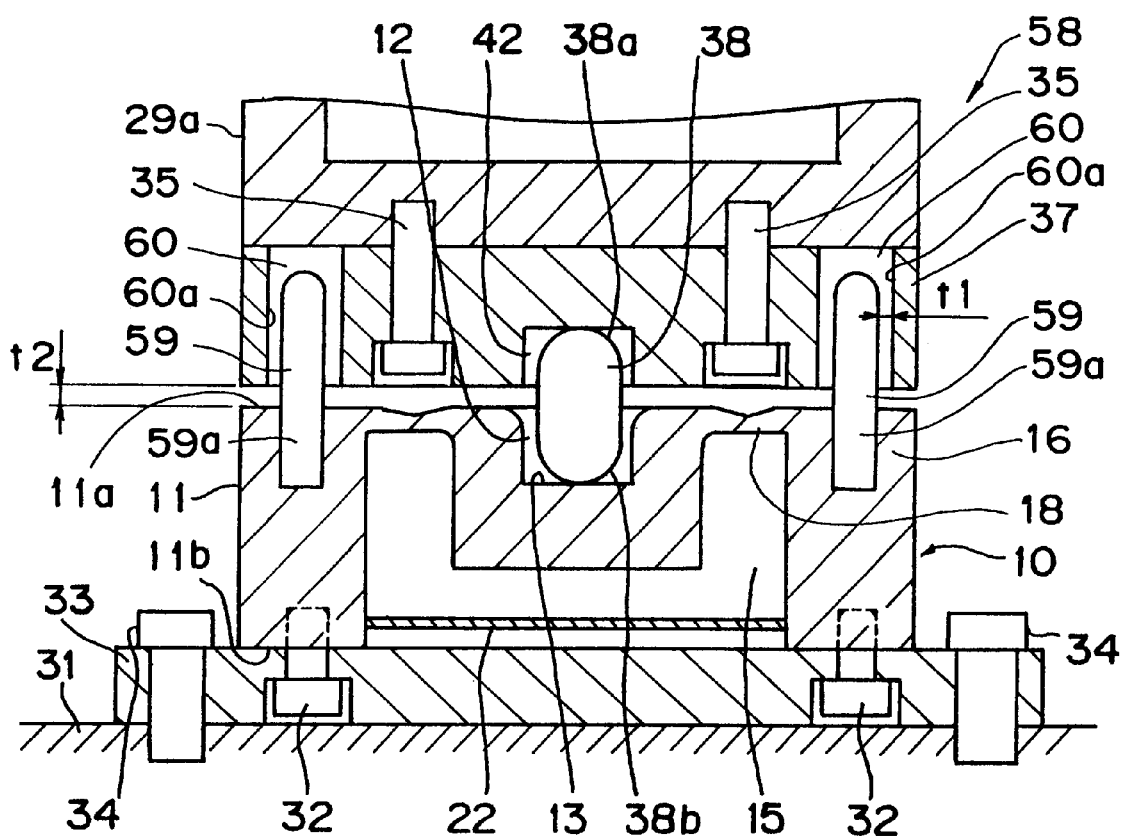
FIG. 7 shows a pertial enlarged sectional view of an another load detecting apparatus provided with the load cell of the first embodiment.

FIG. 7 shows an anther load detecting apparatus 58 provided with the load cell 10 of the first embodiment.

In this load detecting apparatus 58, a plurality of horizontal locating pins 59 having column-like configuration are fixed to the fixing portion 16 of the short column elastic body 11 of the load cell 10. These horizontal locating pins 59 are projected upwardly from the upper end surface 11a of the short column elastic body 11.

On the other hand, pin insertion bores 60 are formed on the lower end surface of the upper pressure plate 37. These pin insertion bores 60 have larger diameter than that of the horizontal locating pins 59. Differing from the load detecting apparatus 28 shown in FIGS. 3 through 6, the upper pressure plate 37 has same diameter as that of the short column elastic body 11 of the load cell 10 and is not provided with the circle concave 41 shown in FIG. 3.

Each horizontal locating pin 59 is inserted into the opposing pin insertion bore 60 so that clearance "t1" of given depth is formed between the outer peripheral surface 59a of the horizontal locating pin 59 and the side wall 60a of the pin insertion bore 60.

Other constitutions of the load cell 10, lower pressure plate 33 and the upper pressure plate 37 are similar to the load detecting apparatus 28 shown in FIGS. 3 through 6. Thus, the same elements are denoted by same numeral.

In this load detecting apparatus 58, owing to the moving of the upper pressure plate 37 toward the direction of the horizontal load "F" at distance corresponding to the clearance "t1", the rolling or the horizontal movement of the hopper 29 (refer to FIG. 3) is absorbed. When the upper pressure plate 37 moves in horizontal direction at the distance over the clearance "t1", a side wall 60a of the pin insertion bore 60 abuts the outer peripheral surface 59a of the horizontal locating pin 59 so that the horizontal load "F" is supported by horizontal locating pin 59 of the load cell 10. Since the horizontal location pin 59 is fixed to the thick column-configuration fixed potion 16 of the short column elastic body 11 having enough rigidity, the horizontal load "F" of large intensity can be surely supported by the upper pressure plate 37.

Figure 8:
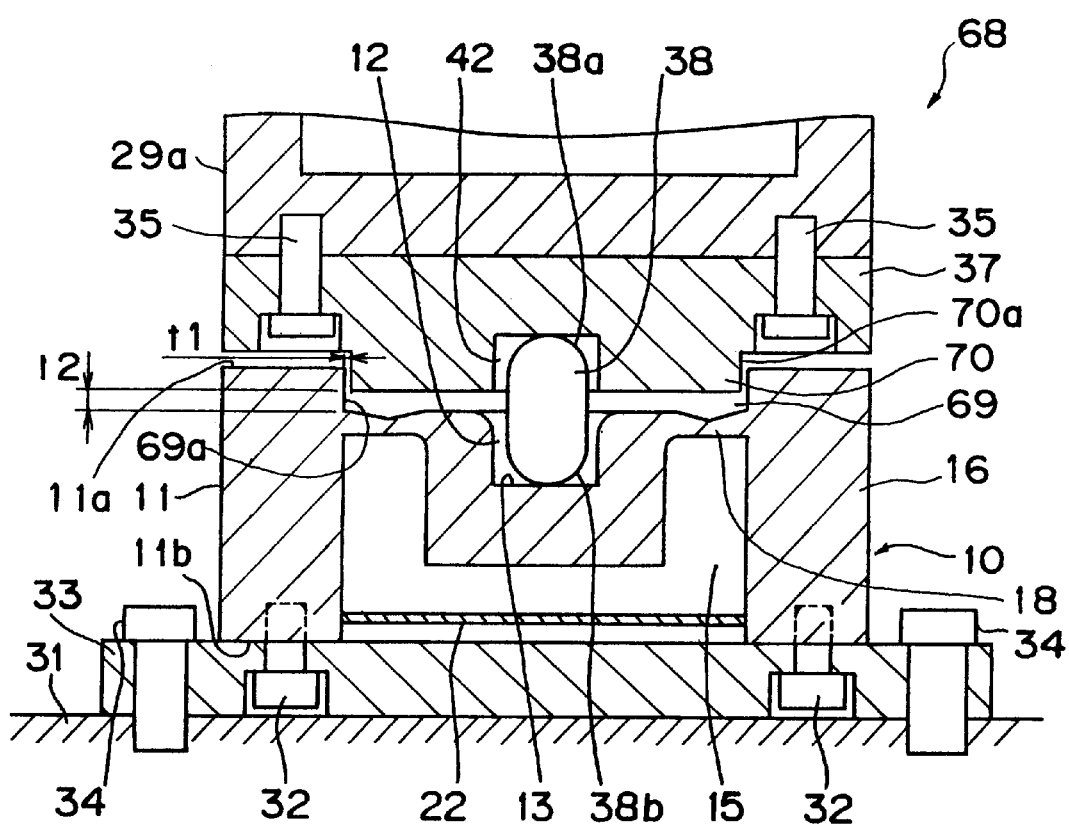
FIG. 8 shows a pertial enlarged sectional view of an another load detecting apparatus provided with the load cell of the first embodiment.

FIG. 8 shows an another load detecting apparatus 68 having the load cell of the present invention.

In this load detecting apparatus 68, the upper end surface 12 of the short column elastic body 11 of the load cell 10 is provided with a circle concave 69 having large diameter than that of the circle bore 12 and being coaxial with the circle bore 12.

On the other hand, the lower end surface of the upper pressure plate 37 is formed with a column-like projection 70 being coaxial to the circle bore 42. This column-like projection 70 is smaller in diameter than the circle concave 69. Further, the column-like projection 70 is loosely inserted into circle concave 69 so that a clearance "t1" having given distance is formed between the outer peripheral surface 70a of the column-like projection 70 and the side wall 69a of the circle concave 69.

Other constitution of the load cell 10, lower pressure plate 33 and the upper pressure plate 37 is similar to the load detecting apparatus 28 shown in FIGS. 3 through 6. Thus, the same elements are denoted by same numeral.

In this load detecting apparatus 68 shown in FIG. 8, owing to the moving of the upper pressure plate 37 toward the direction of the horizontal load "F" at distance corresponding to the clearance "t1", the rolling or the horizontal movement of the hopper 29 (refer to FIG. 3) is absorbed. When the upper pressure plates 37 moves in horizontal direction at the distance over the clearance "t1", the outer peripheral surface 70a of the column-like projection 70 abuts the side wall 69a of the circle concave 69 so that the horizontal load "F" is supported. Owing to the short column elastic body 11 having the fixed portion 16 of thick column configuration and with high rigidity, the horizontal load "F" having large intensity is surely supported by the upper pressure plate 37.

Figure 9:
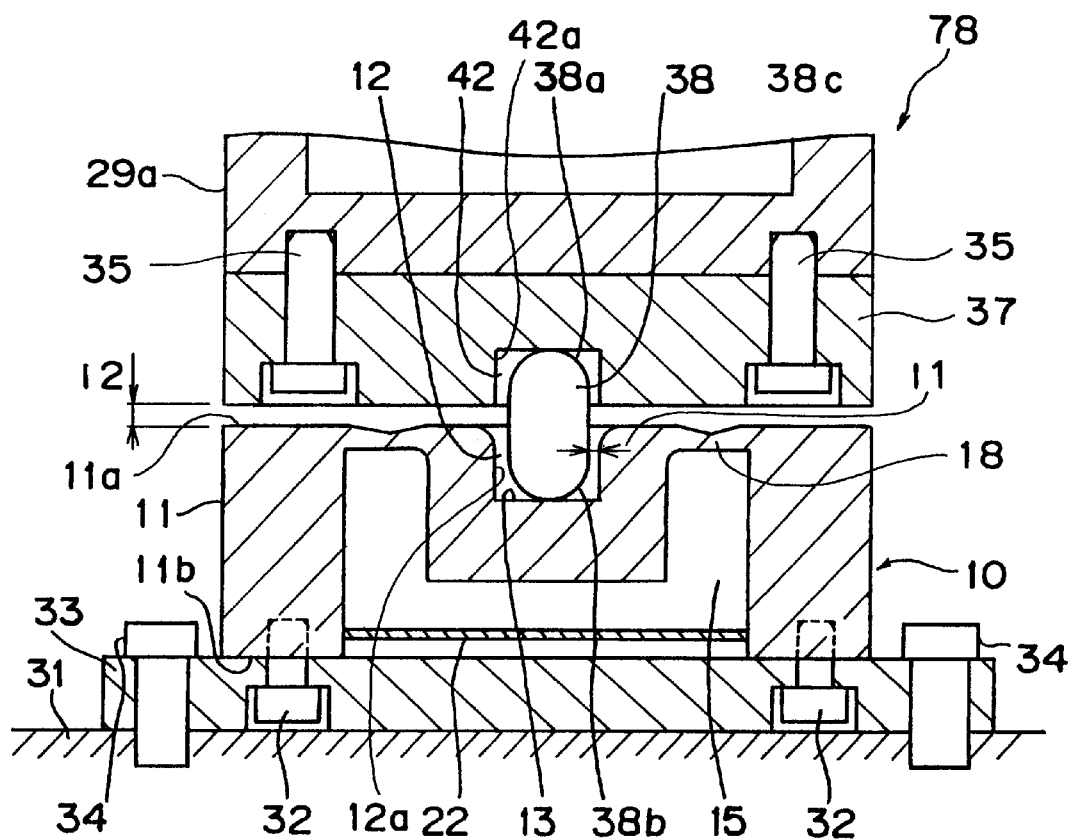
FIG. 9 shows a pertial enlarged sectional view of an another load detecting apparatus provided with the load cell of the first embodiment.

If the horizontal load "F" is small, constitution such as a load detecting apparatus 78 shown in FIG. 9 can be employed. In this load detecting apparatus 78, rolling of the hopper 29 (refer to FIG. 3) is absorbed by the clearance "t1" formed between the outer peripheral surface 38c of the load shaft 38 and the side walls 12a, 42a of the circle bores 12, 42. When the horizontal moving distance of the upper pressure plate 37 exceeds the clearance "t1", outer surface 38c of the load shaft 38 abuts the side walls 12a, 42a of the circle bores 12, 42 so that the horizontal load "F" is supported. Although such constitution is not suitable for supporting horizontal load "F" having large intensity, the constitution of the load detecting apparatus 78 is simple, resulting in further miniaturization thereof.

Second Embodiment

Figure 10:
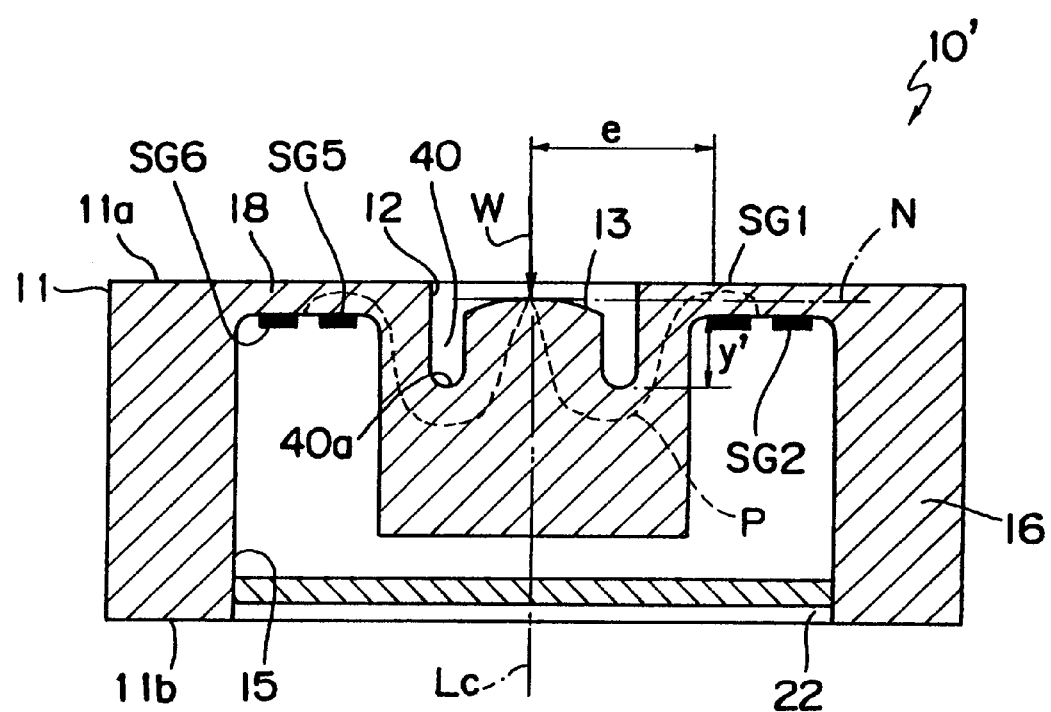
FIG. 10 shows a longitudinal sectional view of a load cell of a second embodiment.

In a load cell 10' of the second embodiment of the invention shown in FIG. 10, depth of the circle bore 12 formed on the upper end surface 11a of the short column elastic body 11 is set so that the load acting surface 13 constituted by the bottom wall of the circle bore 12 is positioned on the neutral axis plan "N" of the strain occurrence portion 18. Further, an annular groove 40 is formed around the load acting surface 13. The depth of the annular groove 40 is set so that the distance "y'" from the bottom wall 40a of the annular groove 40 to the lower surface of the strain occurrence portion 18 is equal to 0.2 to 2 times the horizontal shortest distance "e" form the center axis "$L_C$" to the strain gages "SG1" through "SG8". In the second embodiment, the load acting surface 13 is a part of spherical surface.

In the load cell 10' of the second embodiment, the transmission path "p" of the compressive load "W" is initially directed toward lower end surface 11b, then turns back toward the upper end surface 11a, and reach the strain gages "SG1" through "SG8". Thus the length of the transmission path "p" is long. The shift of the action axis "$L_W$" of the compressive load "W" with respect to the center axis "$L_C$" of the short column elastic body 11 does not have considerable influence to the deformation of the strain occurrence portion 18. Thus, change of the accuracy of load measurement owing to the shift of the load acting axis "$L_W$" is prevented.

Figure 11A:
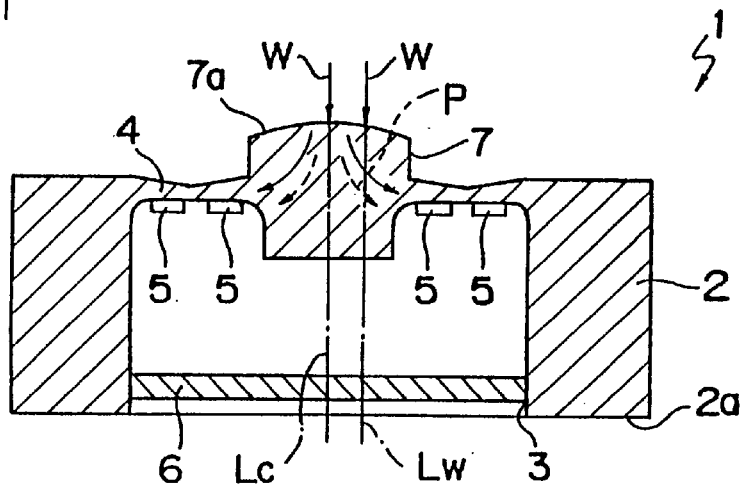
FIG. 11A shows a longitudinal sectional view of a conventional load cell.
Figure 11B:
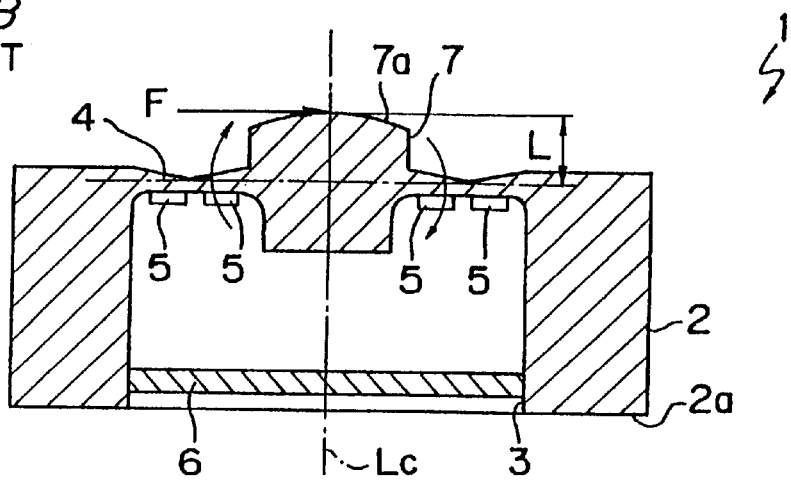
FIG. 11B shows a longitudinal sectional view of a conventional load cell.
Figure 11C:
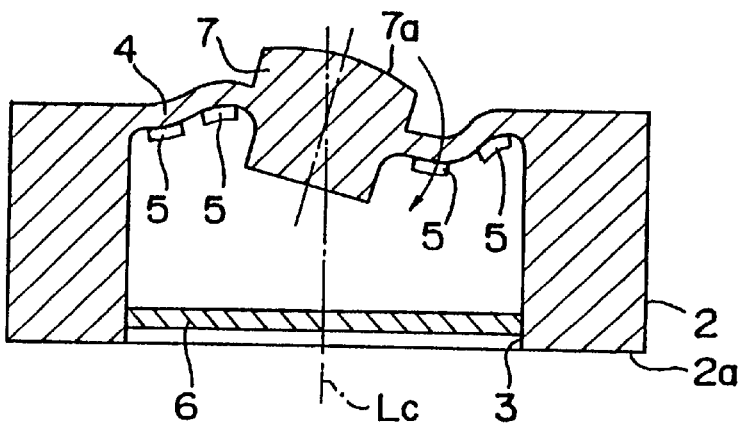
FIG. 11C shows a longitudinal sectional view of a conventional load cell.

As described referring to FIG. 11, the bending moment "M" acting on the strain occurrence portion 18 due to the lateral load is represented by product of value of lateral load "F" multiplied by the distance "L" from the lateral load "F" to the neutral axis plan "N" of the strain occurrence portion 18. In the second embodiment, since the load acting surface 13 is positioned on the neutral axis plane "N", the distance "L" is very short. Thus, when the lateral load "F" acts on the load acting surface 13, the bending moment "M" acting on the strain occurrence portion can be reduced.

Although the upper end surface 11a of the short column elastic body 11 is a flat surface in the second embodiment, the top end surface 11a can be formed with an annular concave having V-like sectional configuration in the same manner as the first embodiment. Further, the load cell 10' of the second embodiment can be used in the load detecting apparatuses shown in FIGS. 3 through 9 in the same manner as the load cell 10 of the first embodiment.

Although the present invention is illustrated according to the preferred embodiment, various change and modifications are clear for the skilled in the art. These changes and modifications are involved within the scope of the invention prescribed by the following claims.

What is claimed is:

1. A load cell comprising:
   a column elastic body;
   a circle bore formed on a center portion of a first end surface of the column elastic body, a bottom wall of which constitutes a load acting surface;
   an annular concave groove formed at least on a second surface of the column elastic body opposing to the first surface and being coaxial with the circle bore, a bottom portion of which constitutes a strain occurrence portion of thin annular wall configuration, a outer portion of which constitutes a fixing portion of thick cylinder configuration; and strain gages stuck on the strain occurrence portion;

wherein a distance from the load acting surface to a surface of the strain occurrence portion on which the strain gages are stuck is 0.2 to 2 times shortest distance from a center axis of the column elastic body to the strain gages.

2. A load cell comprising:

a column elastic body;

a circle bore formed on a center portion of a first end surface of the column elastic body, a bottom wall of which constitutes a load acting surface;

an annular concave groove formed at least on a second surface of the column elastic opposing to the first surface and being coaxial with the circle bore, a bottom portion of which constitutes a strain occurrence portion of thin annular wall configuration, a outer portion of which constitutes a fixing portion of thick cylinder configuration; and strain gages stuck on the strain occurrence portion;

wherein the load acting surface coincides with a neutral axis plane and the annular groove is formed around the load acting surface.

3. The load cell as in claim 1, wherein an annular concave groove having V-like sectional configuration is formed on the first end surface of the column elastic body on which the circle bore is formed.

4. A load detecting apparatus comprising:

a load cell having a column elastic body; a circle bore formed on a center portion of a first end surface of the column elastic body, a bottom wall of which constitutes a load acting surface; an annular concave groove formed at least on a second surface of the column elastic body opposing to the first surface and being coaxial with the circle bore, a bottom portion of which constitutes a strain occurrence portion of thin annular wall configuration, a outer portion of which constitutes a fixing portion of thick cylinder configuration; and strain gages stuck on the strain occurrence portion, wherein a distance from the load acting surface to a surface of the strain occurrence portion on which the strain gages are stuck is 0.2 to 2 times a shortest distance from a center axis of the column elastic body to the strain gages;

a lower pressure plate to which the second end surface of column elastic body of the load cell opposing to the first surface formed with the circle bore is fixed;

an upper pressure plate coupled to a structure a load of which is to be detected, on a lower surface of which a circle bore is formed; and a load shaft both upper and lower ends of which are respectively inserted in loose into the circle bore of the column elastic body of the load cell and the circle bore of the upper pressure plate, and the upper and lower end surfaces of the load shaft having a convex curved surface configuration respectively and abutting the load acting surface constituted by the bottom wall of the circle bore of the column elastic body and the bottom wall of the circle bore of the upper pressure plate.

5. The load detecting apparatus as in claim 4, further comprising a circle concave portion of a larger diameter than that of the column elastic body of the load cell formed on the lower surface of the upper pressure plate, wherein the first end surface of the column elastic body is loosely inserted into the circle concave portion so that a clearance having a predetermined size is formed between the outer peripheral surface of the column elastic body and the side wall of the circle concave portion.

6. The load detecting apparatus as in claim 4, further comprising horizontal locating pins which project from the first end surface of the column elastic body of the load cell; and pin insertion bores of larger diameter than that of the horizontal locating pins which are formed on the lower side of the upper pressure plate, wherein the horizontal locating pins are inserted into the pin insertion bores so that a clearance having a predetermined size is formed between the outer peripheral surface of the horizontal locating pin and the side wall portion of the pin insertion bore.

7. The load cell detecting apparatus as in claim 4, further comprising a circle concave portion which is formed on the first end surface of the column elastic body of the load cell; and a column-like projection of smaller diameter than that of the circle concave portion projecting from the lower face of the upper pressure plate, wherein the column-like projection is loosely inserted into the circle concave portion so that a predetermined clearance between the outer peripheral surface of the column-like projection and the side wall of the circle concave portion.

8. A load detecting apparatus comprising:

a load cell comprising, a column elastic body; a circle bore formed on a center portion of a first end surface of the column elastic body, a bottom wall of which constitutes a load acting surface; an annular concave groove formed at least on a second surface of the column elastic body opposing to the first surface and being coaxial with the circle bore, a bottom portion of which constitutes a strain occurrence portion of thin annular wall configuration and a outer portion of which constitutes a fixing portion of thick cylinder configuration; and strain gages stuck on the strain occurrence portion, wherein the load acting surface coincides with a neutral axis plan and an annular groove is formed on the first surface of the column elastic body around the load acting surface;

a lower pressure plate to which the second end surface of column elastic body of the load cell opposing to the first surface formed with the circle bore is fixed;

an upper pressure plate coupled to a structure a load of which is to be detected, on a lower surface of which a circle bore is formed; and a load shaft both upper and lower ends of which are respectively inserted in loose into the circle bore of the column elastic body of the load cell and the circle bore of the upper pressure plate, and the upper and lower end surfaces of the load shaft having a convex curved surface configuration respectively and abutting the load acting surface constituted by the bottom wall of the circle bore of the column elastic body and the bottom wall of the circle bore of the upper pressure plate.

9. The load detecting apparatus as in claim 8, further comprising a circle concave portion of lager diameter than that of the column elastic body of the load cell formed on the lower surface of the upper pressure plate, wherein the first end surface of the column elastic body is loosely inserted into the circle concave portion so that a clearance having a predetermined size is formed between the outer peripheral surface of the column elastic body and the side wall of the circle concave portion.

10. The load detecting apparatus as in claim 8, further comprising horizontal locating pins which project from the first end surface of the column elastic body of the load cell; and pin insertion bores of larger diameter than that of the horizontal locating pins which are formed on the lower side of the upper pressure plate, wherein the horizontal locating pins are inserted into the pin insertion bores so that a clearance having a predetermined size is formed between the outer peripheral surface of the horizontal locating pin and the side wall portion of the pin insertion bore.

11. The load cell detecting apparatus as in claim 8, further comprising:

a circle concave portion which is formed on the first end surface of the column elastic body of the load cell; and a column-like projection of smaller diameter than that of the circle concave portion projecting from the lower face of the upper pressure plate, wherein the column-like projection is loosely inserted into the circle concave portion so that a predetermined clearance between the outer peripheral surface of the column-like projection and the side wall of the circle concave portion.

12. The load cell as in claim 2, wherein an annular concave groove having V-like sectional configuration is formed on the first end surface of the column elastic body on which the circle bore is formed.

\* \* \* \* \*